United States Patent [19]
Stephens

[11] Patent Number: 5,780,951
[45] Date of Patent: Jul. 14, 1998

[54] LOW-COST BOBBIN-WOUND STATOR CONSTRUCTION FOR SMALL, SINGLE-PHASE AC MOTORS

[75] Inventor: Charles Michael Stephens, Pattersonville, N.Y.

[73] Assignee: General Electric Company, Schenectady, N.Y.

[21] Appl. No.: 772,449

[22] Filed: Dec. 23, 1996

[51] Int. Cl.⁶ .................................................. H02K 17/10
[52] U.S. Cl. .................... 310/172; 310/216; 310/217; 310/40 MM; 310/166
[58] Field of Search .................................. 310/162, 164, 310/194, 216, 217, 218, 40 MM, 272, 166, 211, 172, 258, 259; 318/781, 750

[56] References Cited

U.S. PATENT DOCUMENTS

| | | | |
|---|---|---|---|
| 4,095,130 | 6/1978 | Oshima et al. | 310/162 |
| 4,473,766 | 9/1984 | Obergfell et al. | 310/216 |
| 4,835,839 | 6/1989 | Forbes et al. | 29/596 |

OTHER PUBLICATIONS

R. Thees, "Small Electric Motors", Philips Technical Review, vol. 28, 1965, No. 4/5/6/, pp. 143–144.

H. Schemmann, "Stability of Small Single-Phase Synchronous Motors", Philips Technical Review 33, 235–243, 1973, No. 8/9, pp. 235–243.

Primary Examiner—Steven L. Stephan
Assistant Examiner—Timothy A. Williams
Attorney, Agent, or Firm—Marvin Snyder; Douglas E. Stoner

[57] ABSTRACT

A bobbin-wound stator for small single-phase AC motors that surmounts magnetic compromises required by previous implementations is fabricated of stacked two-piece laminations and a split winding bobbin fitted about a first one of the lamination piece stacks that permits bobbin winding of a single coil about the pole neck of a magnetic yoke having pole shoes magnetically coupled to each other, but not in direct contact with each other, at a predetermined clearance distance chosen to balance rotor-to-armature flux linkage, armature inductance, and reluctance torque. The second lamination piece stack is pressed into the first lamination piece stack supporting the bobbin-wound coil to complete the stator. The stator is usable in several single-phase AC motors, including electronically commutated motors, chaotically-starting permanent magnet motors, and shaded-pole induction motors.

12 Claims, 7 Drawing Sheets

5,780,951

LOW-COST BOBBIN-WOUND STATOR CONSTRUCTION FOR SMALL, SINGLE-PHASE AC MOTORS

FIELD OF THE INVENTION

This invention relates generally to stators and methods for manufacturing same, and more specifically, to a low-cost bobbin-wound stator for small single-phase AC motors, and a method for manufacturing same, which avoids the magnetic characteristics compromises of the prior art.

BACKGROUND OF THE INVENTION

In alternating current (AC) motors, stators that utilize bobbin-wound coils are advantageous because the bobbin-winding technique permits a greater packing of copper conductor in the available winding space. Also, bobbin-winding equipment is easier to implement in the manufacturing process. Bobbin-wound stators are especially suited to two-pole motors and several commercial products are presently marketed. To date, however, implementing a bobbin-wound stator has required some compromise in the magnetic characteristics of the motor.

One common approach used to construct small single-phase electronically commutated motors (ECMs) is employed, for example, by General Electric Company. Fort Wayne, Ind. A stacked assembly of lamination pieces consists of two lamination piece subassemblies: a first subassembly embodying the complete airgap annulus and pole-shoes wherein the pole shoes are connected in a unitary manner by a pair of thin metal bridges; and a second subassembly embodying a magnetic yoke. A prewound bobbin coil, comprising the motor armature, is fitted over the magnetic yoke piece, and the pole-shoes subassembly is then pressed into the yoke piece to complete the stator.

A magnetic compromise in this design comes about from the thin metal bridges joining the pole shoes. These bridges are made as thin as possible, but nevertheless cause the armature inductance to be undesirably high, making commutation of the armature current difficult. The bridges also shunt some of the flux from the permanent magnet rotor away from the armature, reducing the torque production efficacy.

Another approach, used to construct small chaotically-starting permanent magnet motors, was originally described in Thees. R., "Small Electric Motors," Philips Technical Review, Vol. 16. No. 4/5/6. Schemman, H., "Stability of small single-phase synchronous motors," Phillips Technical Review, Rev. 33. No. 8/9, 1973, pp. 235–243, contains a detailed analysis of the starting characteristics of such motors. Here, a single, unitary lamination piece assembly is employed, comprising both pole-shoes and the yoke to form the complete stator magnetic circuit in which the pole-shoes are separated from one another by a clearance distance sufficient to enable bobbin fitting. Twin prewound bobbin coils, comprising the motor armature, are then fitted over and moved past the two pole shoes—one onto each pole shoe—taking advantage of the pole shoe clearance, and onto the lamination piece assembly to complete the stator.

The elimination of connecting bridges between the pole shoes in this design helps to reduce the armature inductance. The magnetic compromise, however, comes about from making the lamination piece assembly as a single piece onto which the twin prewound bobbin coils must then be fitted. In order to fit the prewound bobbin coils into this single piece lamination assembly, the pole-shoe clearance must be excessively large. This diminishes the amount of flux from the permanent magnet rotor that can be linked into the armature, thereby reducing torque production efficacy. The excessive pole-shoe clearances also introduce a severe reluctance variation that causes the reluctance torque to be excessive.

Many geometrical variations of these design are found on the market, all possessing the same magnetic deficiencies and requiring various compromises in the magnetic characteristics of the stator.

It would be desirable to simultaneously eliminate the need for any bridge directly connecting the pole shoes, provide complete flexibility with respect to the clearance between the pole shoes, and yet continue to enable use of tightly-packed bobbin winding coils to construct AC motor stators. Such stator could then be designed with pole-shoe clearances that are fine-tuned to strike a proper balance among rotor-to-armature linkage, armature inductance, and reluctance torque, and would enable bobbin windings that maximize the available copper area to the limit of magnetic saturation so as to reduce armature losses.

It would also be desirable to develop an electronically commutated motor or a chaotically-starting permanent magnet motor, both of which have a permanent magnet rotor, or a shaded-pole induction motor, which has an induction squirrel-cage rotor.

OBJECTS OF THE INVENTION

Accordingly, an object of the present invention is to provide a new and improved stator and method of manufacturing same that does not require any bridge or other connection between the stator pole shoes and yet provides complete flexibility with respect to the clearance distance between the pole shoes.

Another object of the invention is to provide a new and improved stator comprising a bobbin wound by techniques that maximize the available copper winding area and permit winding to the limit of magnetic saturation while enabling a proper balance to be achieved among rotor-to-armature linkage, armature inductance, and reluctance torque, with minimal armature losses.

Another object of the invention is to provide a new and improved stator and method of manufacturing same that may be used for an electronically commutated motor or a chaotically-starting permanent magnet motor, both of which employ a permanent magnet rotor, or for a shaded-pole induction motor.

SUMMARY OF THE INVENTION

The stator invention disclosed herein is comprised of two lamination piece assemblies allowing optimal proportioning of all portions of the magnetic circuit. The first lamination piece assembly comprises one pole-shoe, pole-neck, and a portion of the yoke. A split coil-winding bobbin is fitted about the pole-neck of the stacked assembly of the first lamination piece. The armature coil is then wound about the split bobbin and first lamination piece assembly by bobbin winding technique. When the armature coil winding is completed, the second lamination piece assembly, comprising the other pole-shoe and the remainder of the yoke, is pressed into the first lamination piece assembly to complete the stator.

The resulting stator has none of the magnetic compromises ascribed to the prior art. The pole-shoe clearances may be designed to strike the proper balance between rotor-to-armature linkage, armature inductance, and reluctance torque. The pole-neck can be narrowed to the limit of magnetic saturation, maximizing the available copper area to reduce armature losses. The stator may be used in an electronically commutated motor or a chaotically-starting permanent magnet motor, both of which employ a permanent magnet rotor. If the pole-shoes are additionally fitted with shading coils, the invention can be used in a shaded-pole induction motor.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

Figure 1A:
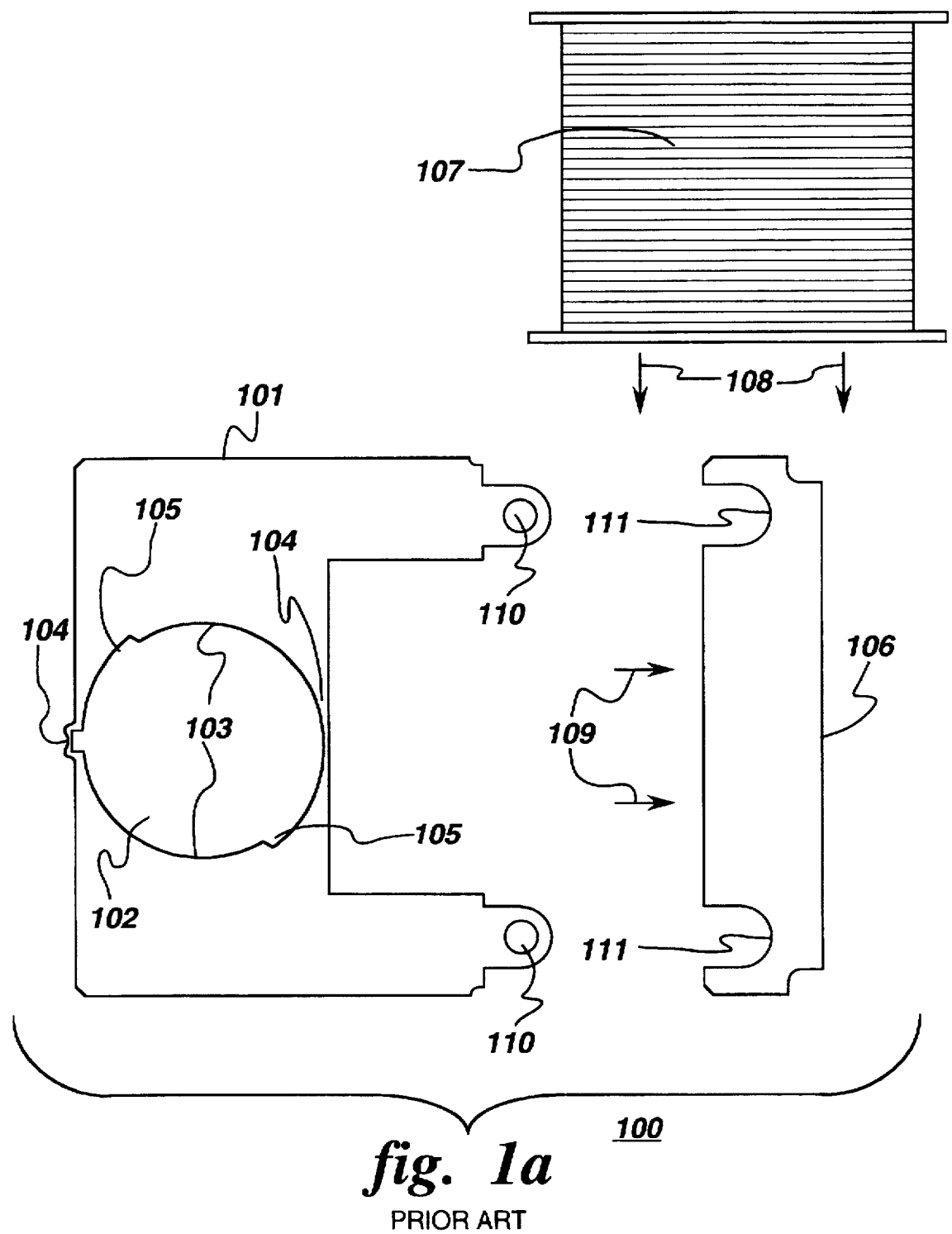
FIGS. 1a and 1b are plan views that illustrate prior art wherein the pole-shoes are connected by a thin metal bridge which causes the armature inductance to be undesirably high and also shunts some of the flux from the permanent magnet rotor away from the armature, reducing the efficacy of torque production.
Figure 1B:
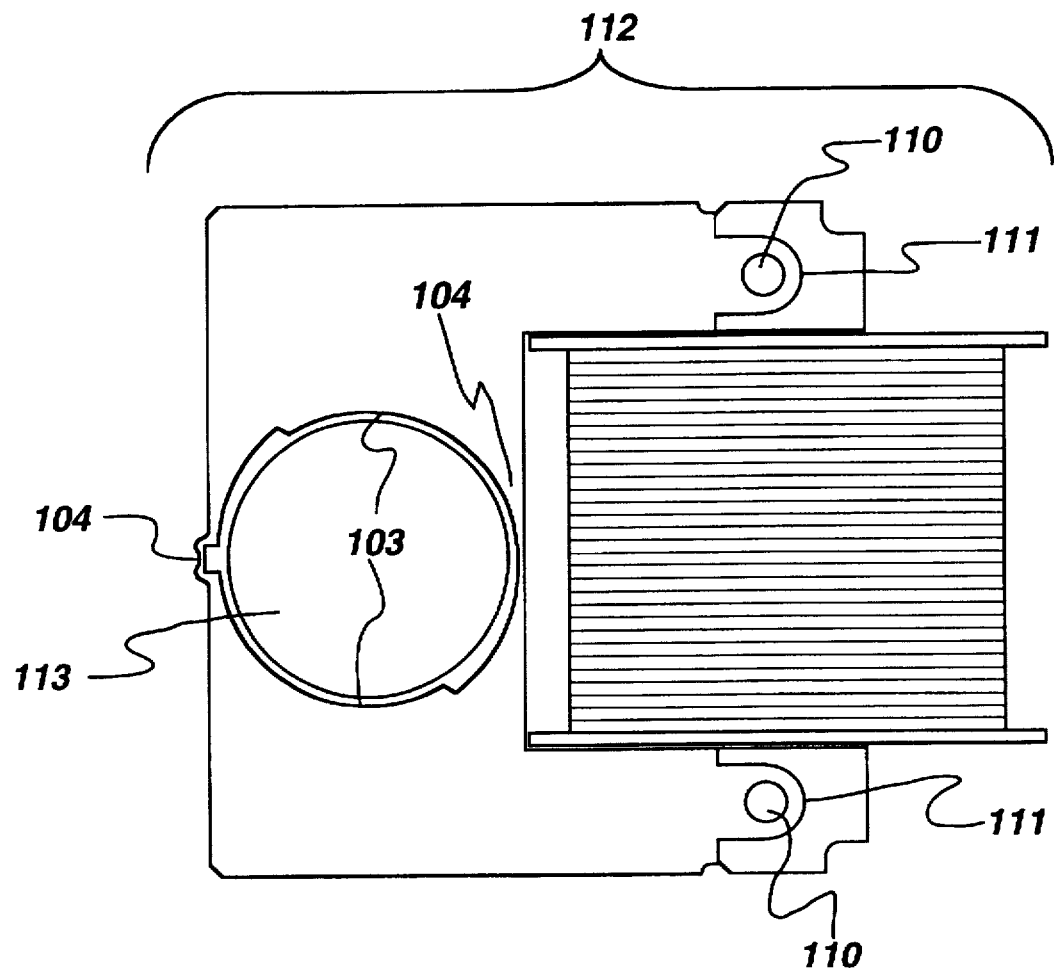

FIG. 1a depicts the prior art approach to construction of small single-phase electronically commutated motors (ECMs). Each lamination 100 comprises two lamination pieces: a first, pole-shoes lamination piece 101 embodying a complete airgap annulus 102 and pole-shoes 103 wherein the pole shoes are connected integrally through a pair of thin metal bridges 104, and parking notches 105 which enable the rotor (112, see FIG. 1b) to be started from rest; and a second, yoke lamination piece 106. A prewound bobbin coil 107, comprising the motor armature, is fitted over a stack or assembly of magnetic yoke lamination pieces 106 as indicated by the double-arrows 108, a stack or assembly of pole-shoes lamination pieces 101 is then moved into proximity with yoke lamination piece assembly 106 as indicated by the double-arrows 109, and pole-shoes lamination piece assembly 101 is then pressed into yoke lamination piece assembly 106 to complete the stator. This pressed fit is typically accomplished with the semi-circular bosses and concentric pinholes 110 located on pole-shoes piece 101. After the two lamination piece assemblies are fitted together, as shown in FIG. 1b, expansion pins are driven into pinholes 110, expanding the surrounding metal into circular receptors 111 (see also FIG. 1a) in yoke piece 106. The completed stator 112, including permanent magnet rotor 113, is shown in FIG. 1b.

A magnetic compromise in the design of FIG. 1b is required because of the thin metal bridges 104 joining pole shoes 103. These bridges are made as thin as possible, but they still cause the armature inductance to be undesirably high, making commutation of the armature current difficult. The bridges also shunt some of the flux from the permanent magnet rotor away from the armature, reducing the torque production efficacy.

Figure 2A:
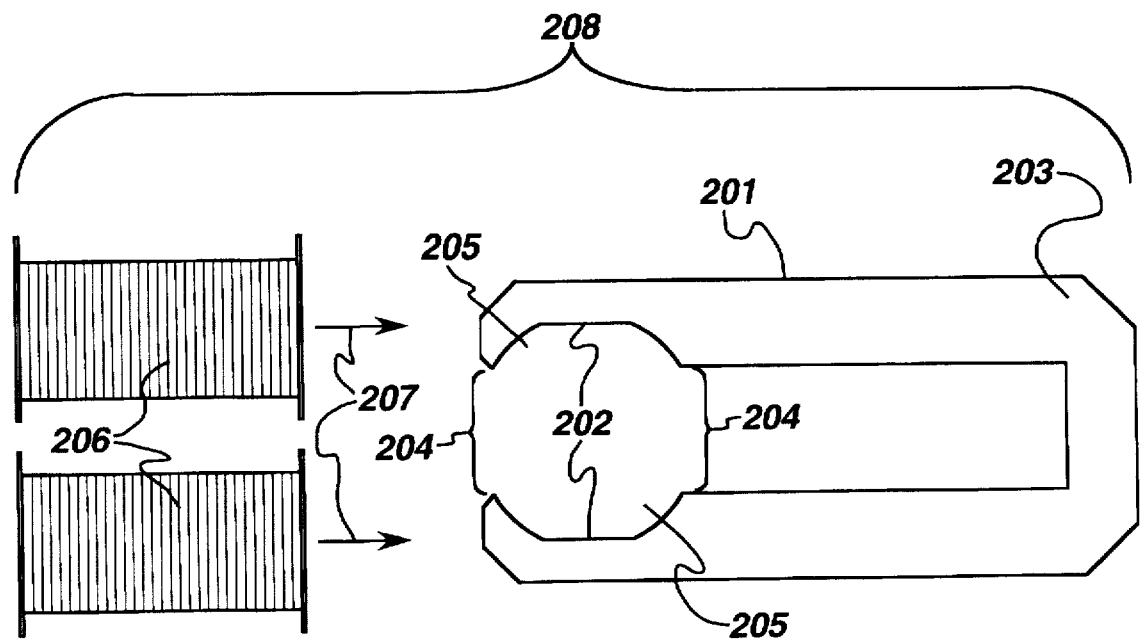
FIGS. 2a and 2b are plan views of the prior art wherein twin prewound bobbin coils are fitted past the two pole-shoes such that the pole-shoes require a clearance distance that reduces rotor-to-armature flux linkage and causes an excessive reluctance torque.
Figure 2B:
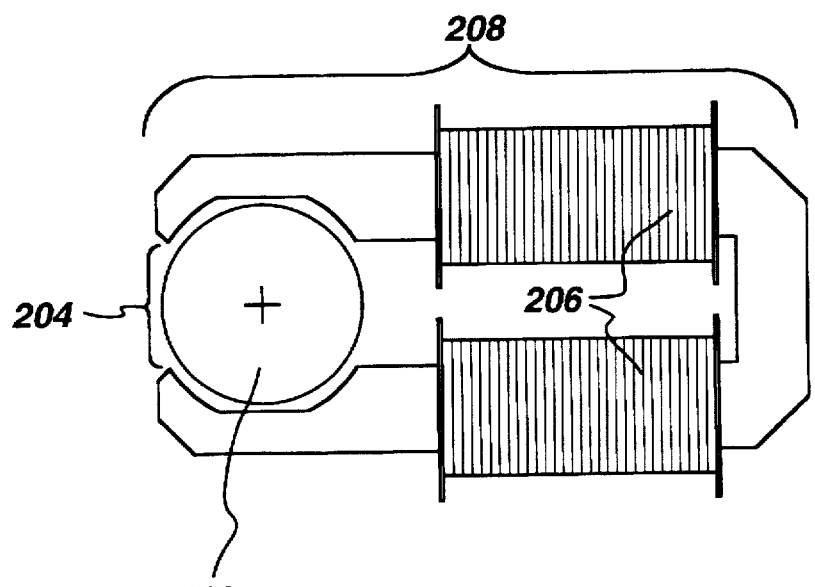

FIG. 2a illustrates a prior art approach to construction of small chaotically-starting permanent magnet motors. Here, a single, unitary piece lamination 201 comprising both pole-shoes 202 and yoke 203 is employed to form the complete stator magnetic circuit, with pole-shoes 202 separated from one another by a clearance distance 204 sufficient to enable bobbin fitting and comprise parking notches 205. Twin prewound bobbin coils 206, comprising the motor armature, are then fitted over and moved past the two pole shoes 202—one onto each pole shoe, as depicted by the double arrows 207—taking advantage of pole shoe clearance 204, and onto an assembly of lamination pieces 201 to complete the stator 208. The completed stator 208 is shown in FIG. 1b, including permanent magnet rotor 113.

Elimination of connecting bridges between the pole shoes, such as bridges 104 shown in FIGS. 1a and 1b, helps to reduce the armature inductance. A magnetic compromise in this design, however, comes about from fabricating the laminations of assembly 201 as a single piece onto which the twin prewound bobbin coils 206 must then be fitted. In order to fit the prewound bobbin coils 206 onto single piece lamination assembly 201, pole-shoe clearance 204 must be excessively large. This diminishes the amount of flux from permanent magnet rotor 113 that can be linked into the armature comprised of bobbin coils 206, thereby reducing torque production efficacy. The excessive pole-shoe clearance also introduces a severe reluctance variation that results in excessive reluctance torque.

Figure 3:
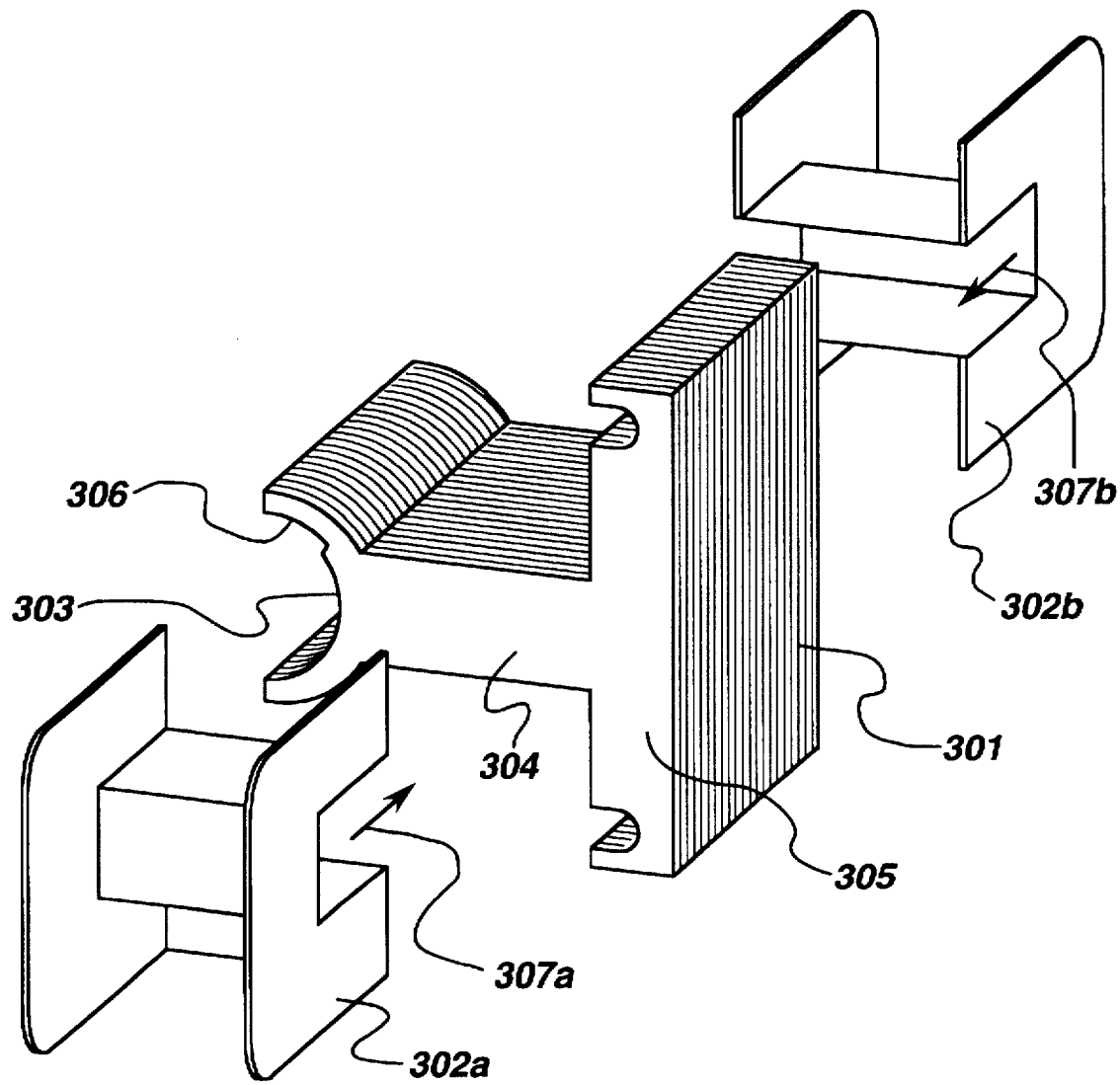
FIG. 3 is an exploded perspective view of the present invention, depicting a first lamination piece assembly, a split bobbin, and the manner in which the split bobbin is fitted around a pole-neck of the first lamination piece assembly.

FIG. 3 illustrates a two piece lamination, in accordance with the invention, that allows optimal proportioning of all portions of the magnetic circuit. In particular, FIG. 3 depicts a first lamination piece 301, and a complementary pair of split bobbin winding pieces 302a and 302b. It is possible, but not required, for pieces 302a and 302b to be identical and interchangeable. Consistent with settled art in this field, these bobbin pieces are fabricated of plastic or some other insulating material appropriate for bobbin winding that will not respond to magnetic flux. The first lamination piece stack or assembly comprises a first pole-shoe 303, pole-neck 304, and a first portion of the yoke 305. Pole shoe 303 also includes a first parking notch 306. In preparation for bobbin winding, split bobbin winding pieces 302a and 302b are moved in the direction of arrows 307a and 307b, respectively, and then fitted together surrounding pole-neck 304 of lamination piece assembly 301. This split coil-winding bobbin comprising complementary pieces 302a and 302b is needed because pole-neck 304 is made narrower than pole-shoe 303 to maximize the coil winding space, making it impossible to slide on a single-piece, prewound bobbin.

Figure 4:
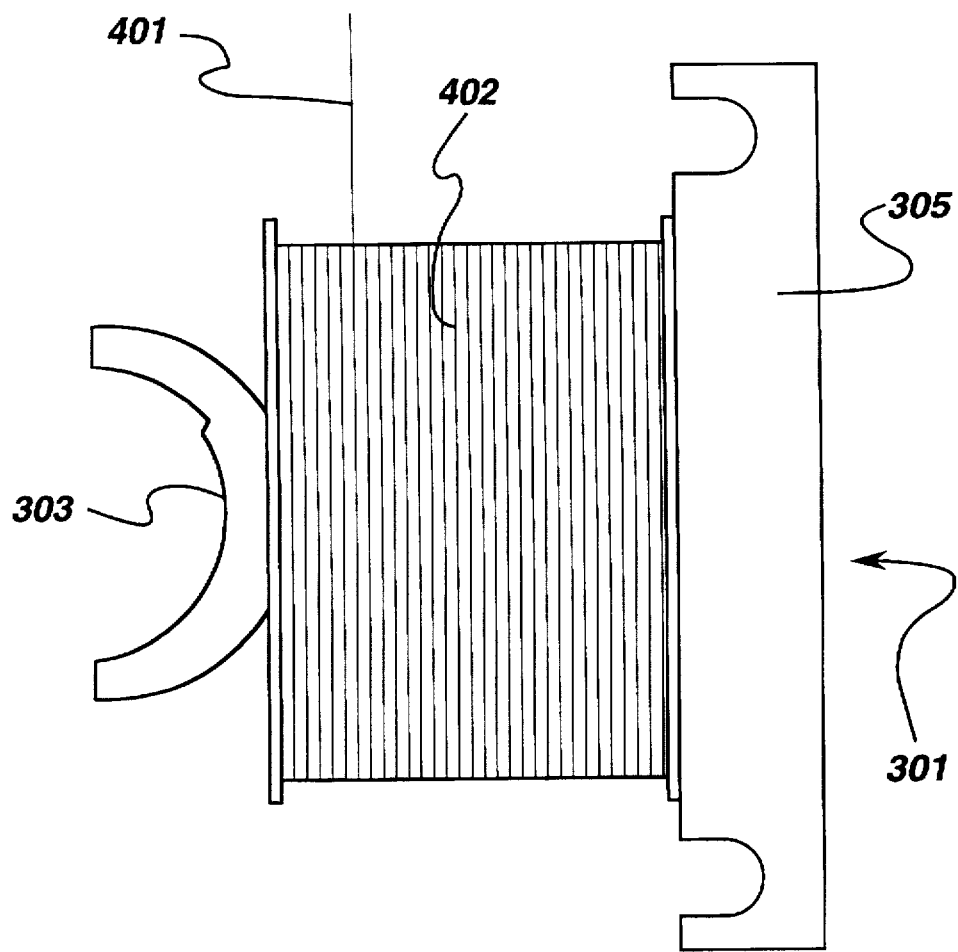
FIG. 4 is a plan view of an armature coil being wound about the split bobbin and first lamination piece assembly.

As shown in FIG. 4, after complementary split bobbin winding pieces 302a and 302b (now hidden) have been fitted about pole neck 304 (also now hidden) of lamination piece assembly 301, conductive wire 401 is then wound into an armature coil winding 402 about the split bobbin and first lamination piece assembly, using conventional bobbin winding technique.

Figure 5:
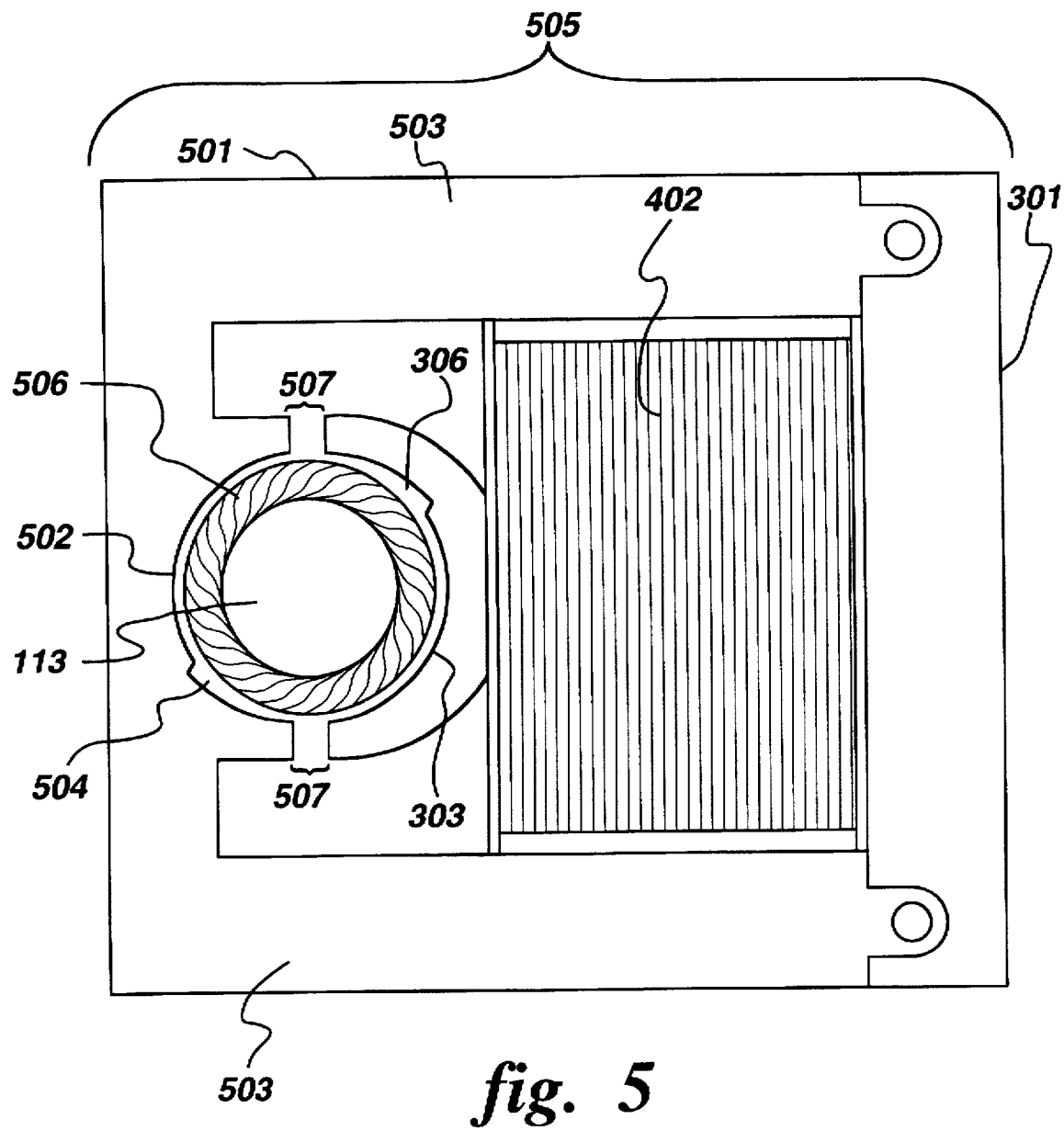
FIG. 5 is a plan view of a second lamination piece assembly pressed into the first lamination piece assembly, to complete a stator that is a preferred embodiment of the invention and that surrounds a permanent magnet rotor shown schematically.

Finally, as shown in FIG. 5, when armature coil winding 402 is completed, a second lamination piece stack or assembly 501, comprising a second pole-shoe 502 and remaining yoke portions 503 with a second parking notch 504, is pressed into first lamination piece stack or assembly 301 using expansion pins and the pin-expansion technique described earlier in connection with FIG. 1, to complete the stator. The completed stator 505 encloses rotor 113, including its permanent magnet 506, within the annulus formed when pole-shoes 303 and 502 are brought into proximity with one another.

Stator 505 has none of the magnetic compromises found in the prior art. Pole-shoe clearances 507 may be designed and accurately established during fabrication of the manufacturing dies used to punch the lamination pieces which are then stacked together to form first and second lamination piece assemblies that strike the proper balance between rotor-inductance, linkage, armature inductance, and reluctance torque. The pole-neck (304 in FIG. 3, hidden in FIG. 5) can be narrowed to the limit of magnetic saturation, maximizing the available copper area so as to reduce armature losses. The semicircular bosses and concentric pinholes may, alternatively, be employed on the first lamination piece assembly and the circular receptors employed on the second lamination piece assembly. Stator 505 and its method of assembly as set forth herein can be used for an electronically commutated motor or a chaotically-starting permanent magnet motor, both of which employ a permanent magnet rotor.

Figure 6:
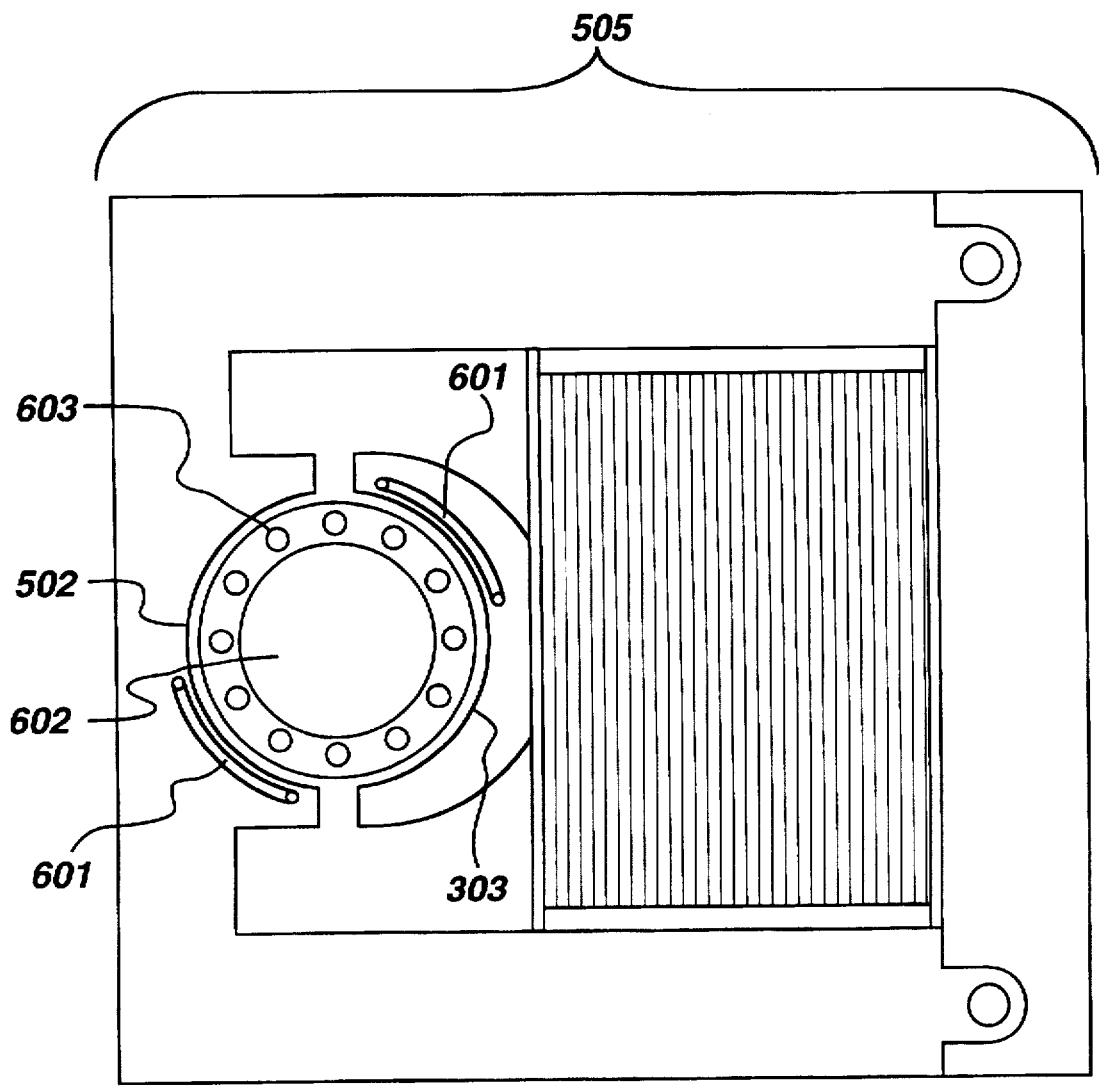
FIG. 6 is a plan view depicting the pole shoes optionally fitted with shading coils, enabling the stator to be used for a shaded-pole induction motor.

FIG. 6 depicts the optional fitting of pole shoes 303 and 502 with shading coils 601 in place of the parking notches 306 and 504 shown in FIG. 5, and a squirrel-cage rotor 602 with a plurality of axial rotor bars 603 in place of permanent magnet rotor 113 of various earlier Figures. This construction allows the completed stator 505 to be used for a shaded-pole induction motor.

While only certain preferred features of the invention have been shown and described herein, many modifications and changes will occur to those skilled in the art. For example, the freedom enabled by this invention in the creation of manufacturing dies used to punch the lamination pieces allows unrestricted adjustment of the depth and angular orientation of the parking notches in permanent magnet variations, and in the size and angular orientation of the shading coils in induction motor variations. It is therefore to be understood that the appended claims are intended to cover all such modifications and changes as fall within the true spirit of the invention.

What is claimed is:

1. A motor stator, comprising:
   a first assembly of stacked lamination pieces including a pole neck, a first yoke portion adjacent one end of said pole neck, and a first pole shoe adjacent the other end of said pole neck;
   a split bobbin fitted about said pole neck;
   a conductor wound into an armature coil about said split bobbin; and
   a second assembly of stacked lamination pieces including a second pole shoe and remaining yoke portions attached to the first assembly of stacked lamination pieces such that said remaining yoke portions are in direct contact with said first yoke portion while the first and second pole shoes are in proximity with each other, so as to be magnetically coupled but not in direct contact with one another, at a predetermined clearance distance chosen to balance rotor-to-armature flux linkage, armature inductance, and reluctance torque.

2. The stator of claim 1 wherein said pole neck is narrow to the limit of magnetic saturation in order to maximize available conductor area.

3. The stator of claim 1 wherein said pole neck is narrower than said first and second pole shoes.

4. The stator of claim 1 wherein said second assembly further includes semi-circular bosses and concentric pinholes, and wherein said first assembly further includes circular receptors; said stator further comprising:
   an expansion pin situated in each respective one of the first and second assemblies, said assemblies being attached to one another by expansion of the lamination material surrounding said pins into said circular receptors.

5. The stator of claim 1 wherein said first assembly further includes semi-circular bosses and concentric pinholes, and wherein said second assembly further includes circular receptors; said stator further comprising:
   an expansion pin situated in each respective one of the first and second assemblies, said assemblies being attached to one another by expansion of the lamination material surrounding said pins into said circular receptors.

6. A motor having a rotor, and a stator surrounding said rotor, said stator comprising:
   a first assembly of stacked lamination pieces including a pole neck, a first yoke portion adjacent one end of said pole neck, and a first pole shoe adjacent the other end of said pole neck;
   a split bobbin fitted about said pole neck;
   a conductor wound into an armature coil about said split bobbin; and
   a second assembly of stacked lamination pieces including a second pole shoe and remaining yoke portion attached to the first assembly of stacked lamination pieces such that said remaining yoke portions are in direct contact with said first yoke position while the first and second pole shoes are in proximity with each other, so as to be magnetically coupled but not in direct contact with one another, at a predetermined clearance distance chosen to balance rotor-to-armature flux linkage, armature inductance, and reluctance torque.

7. The motor of claim 6 wherein said rotor includes a permanent magnet.

8. The motor of claim 6 wherein said rotor comprises a squirrel-cage rotor.

9. The motor of claim 6 wherein said pole neck is narrow to the limit of magnetic saturation in order to maximize available conductor area.

10. The motor of claim 6 wherein said pole neck is narrower than said first and second pole shoes.

11. The motor of claim 6 wherein said second assembly further includes semi-circular bosses and concentric pinholes, and wherein said first assembly further includes circular receptors; said stator further comprising:
    an expansion pin situated in each respective one of the first and second assemblies, said assemblies being attached to one another by expansion of the lamination material surrounding said pins into said circular receptors.

12. The stator of claim 6 wherein said first assembly further includes semi-circular bosses and concentric pinholes, and wherein said second assembly further includes circular receptors; said stator further comprising:

an expansion pin situated in each respective one of the first and second assemblies, said assemblies being attached to one another by expansion of the lamination material surrounding said pins into said circular receptors.

* * * * *